March 14, 1961

M. BENTELE ET AL 2,974,522

DIRECT DRIVE TORQUEMETER

Filed Feb. 11, 1959

INVENTORS
MAX BENTELE
HANS D. DEHNE
CRANSTON W. FOLLEY

BY *Victor D. Behn*

ATTORNEY

March 14, 1961 M. BENTELE ET AL 2,974,522
DIRECT DRIVE TORQUEMETER
Filed Feb. 11, 1959 3 Sheets-Sheet 2

INVENTORS
MAX BENTELE
HANS D. DEHNE
CRANSTON W. FOLLEY
BY Victor D. Behn
ATTORNEY

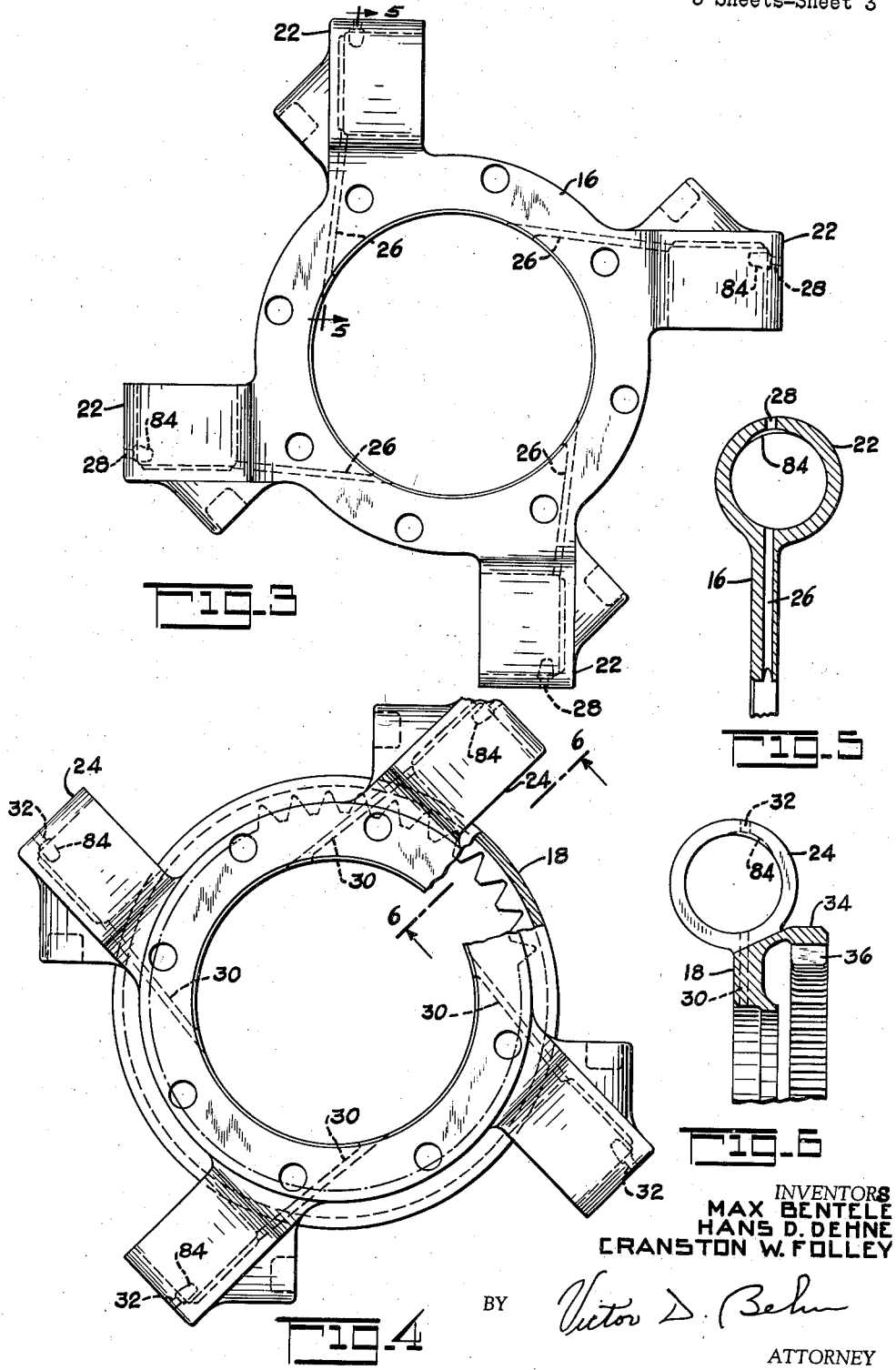

United States Patent Office 2,974,522
Patented Mar. 14, 1961

2,974,522
DIRECT DRIVE TORQUEMETER

Max Bentele, Ridgewood, and Hans D. Dehne, Montclair, N.J., and Cranston W. Folley, Kennebunk, Maine, assignors to Curtiss-Wright Corporation, a corporation of Delaware Filed Feb. 11, 1959, Ser. No. 792,554

10 Claims. (Cl. 73—136)

This invention relates to apparatus for measuring the torque transmitted from one rotating shaft to another and is particularly directed to hydraulic torque measuring apparatus for shafts connected together for rotation in the same direction at the same speed, that is for shafts connected together for rotation in the same direction at 1:1 speed ratio.

In the case of a transmission drivably connecting one shaft to another other than a 1:1 speed ratio, some fixed member of the transmission is subject to a reaction torque which is proportional to the torque transmitted by said shafts. Hydraulic apparatus for measuring such reaction torque is a known and reliable way of measuring the torque transmitted by rotating shafts drivably connected together at other than 1:1 speed ratio.

Generally no such fixed torque reaction member is present if a pair of shafts are connected together at 1:1 speed ratio. An object of the present invention comprises the provision of novel and simple apparatus for providing a fluid pressure proportional to the torque transmitted by a pair of shafts connected together for rotation at 1:1 speed ratio.

A further object of the invention comprises the provision of novel torque measuring apparatus coupling a pair of shafts together at 1:1 speed ratio, said apparatus including a plurality of piston-cylinder assemblies rotatable with said shafts for transmitting said torque through liquid in the cylinder of each piston-cylinder assembly, such that a hydraulic pressure is provided which is proportional to the torque transmitted by said shafts. A still further object of the invention comprises the provision of a novel arrangement compensating for the centrifugal forces on the liquid within said piston-cylinder assemblies in order that the torque-measuring hydraulic pressure depends only on the torque transmitted by said shafts and is independent of the rotational speed of said shafts.

Other objects of the invention will become apparent upon reading the annexed detailed description in connection with the drawing in which:

Fig. 3 is an end view of one of the two coupling members of the apparatus on which one-half of the cylinders of the piston-cylinder assemblies are formed;

Figure 1:
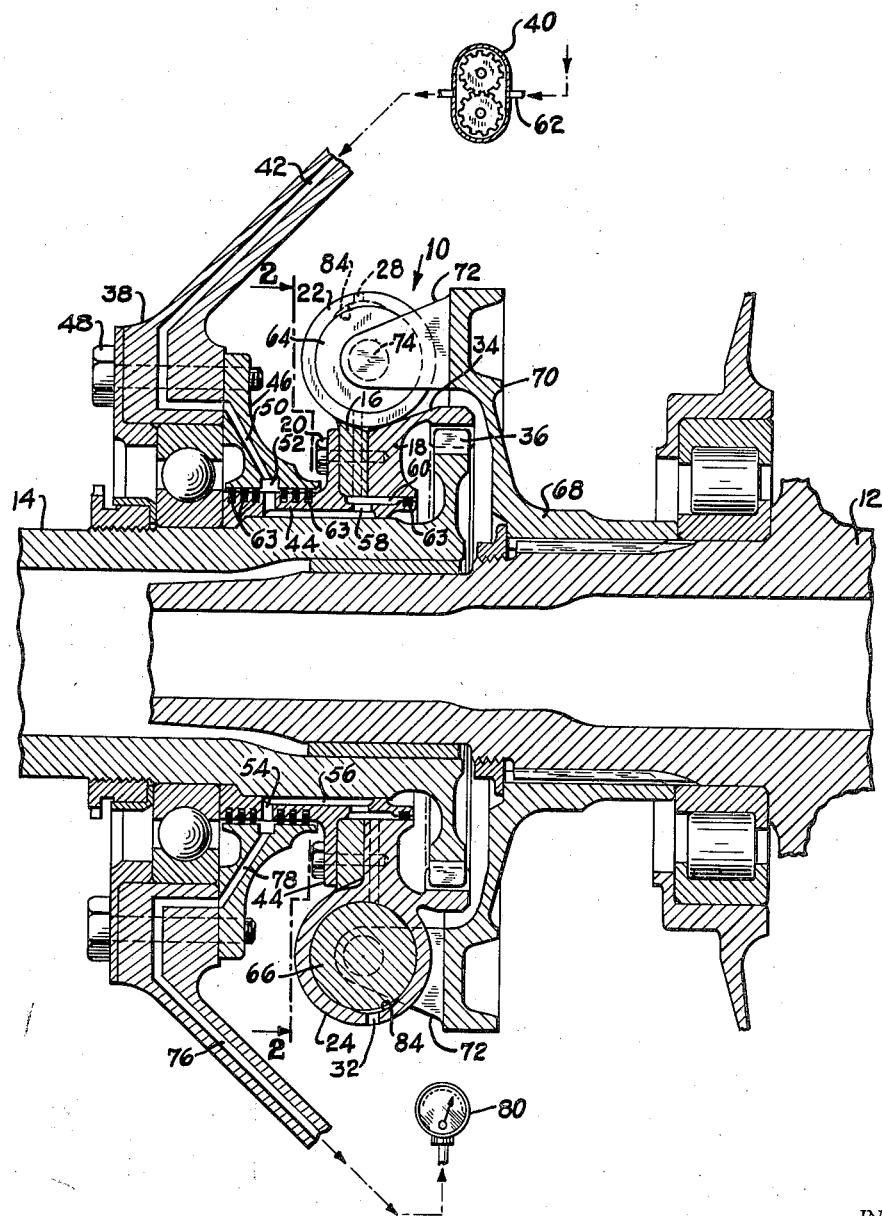
Fig. 1 is an axial sectional view taken along line 1—1 of Fig. 2 and illustrating torque measuring apparatus embodying the invention.

Fig. 4 is an end view similar to Fig. 3 but illustrating the other such coupling member; and Figs. 5 and 6 are sectional views taken along lines 5—5 and 6—6 respectively of Figs. 3 and 4.

Referring to the drawing, reference numeral 10 generally designates a coupling and torque measuring apparatus for connecting an input shaft 12 with a co-axial output shaft 14 for rotation in the same direction at 1:1 speed ratio.

In the structure illustrated the shaft 12 is intended for the output shaft of an helicopter aircraft engine (not shown) and the shaft 14 is the rotor drive shaft. That is the shaft 12 is the input shaft of the coupling 10 and the shaft 14 is its output shaft. As will be apparent, however, the invention is not limited to this specific helicopter use and instead is of general application.

The apparatus 10 includes a pair of annular members 16 and 18 having flat annular portions co-axially secured together in side-by-side relation by screws 20. The individual members 16 and 18 are best seen in Figs. 3 and 4, respectively. The member 16 has a plurality of circumferentially-spaced cylinders 22 formed about its periphery. Similarly the member 18 has a plurality of circumferentially-spaced cylinders 24 formed about its periphery. When the annular members 16 and 18 are secured together by the screws 20, the cylinders 22 are disposed between the cylinders 24 such that said cylinders are equally spaced circumferentially. In addition, the cylinders 22 and 24 all have their axes disposed in a common plane transverse to the axis of the shafts 12 and 14 with the axis of each cylinder being inclined somewhat to a tangential direction in the manner and for the reasons hereinafter described.

The cylinders 22 and 24 are formed on two members instead of on only a single member merely to facilitate fabrication. Thus as illustrated with only four cylinders on each member 16 and 18, the bore of each cylinder can readily be machined without interference from an adjacent cylinder.

The member 16 has a plurality of passages 26, one for each cylinder 22 for supplying a liquid, such as engine lubricating oil, to said cylinder. Each passage 26 extends from the inner periphery of its member 16 to the radially inner side of its cylinder 22 adjacent to the head end of said cylinder. In addition each cylinder 22 has a vent or drain passage 28 on its radially outer side and adjacent to its cylinder head end. For ease of fabrication the pasages 26 and 28 of each cylinder 22 are axially alined as illustrated.

Similarly the member 18 has a plurality of passages 30, one for each of the cylinders 24 for supplying a liquid, such as engine lubricating oil, to said cylinders. Each passage 30 extends from the inner periphery of the member 18 to the radially inner side of its cylinder 24 adjacent to the head end of said cylinder. In addition each cylinder 24 has a vent or drain passage 32 on its radially outer side and adjacent to its cylinder head end. Again, for ease of fabrication the passages 30 and 32 of each cylinder 24 are axially alined as illustrated.

The annular member 18 has an annular flange 34 which is axially splined at 36 to the output shaft 14. The shaft 14 is journaled within an engine housing support member 38 through which engine lubricating oil is supplied by a pump 40 and passage 42. An oil transfer bushing 44 is secured to the coupling members 16 and 18 by the screws 20. The bushing 44 has a tight fit about the shaft 14 and extends within a fixed annular member 46 secured to the housing 38 as by screws 48.

The annular member 46 has an oil passage 50 forming an extension of the housing passage 42 and terminating at its inner end in an annular groove 52. The oil transfer bushing 44 has a plurality of radial holes 54 which provide communication from said annular groove 52 to one end of an annular groove 56 formed on the inner surface of the bushing 44 intermediate the bushing ends. A second plurality of radial holes 58 in the bushing 44 provide communication between the other end of the annular groove 56 and a relatively short external annular groove 60 in the bushing 44.

The cylinder passages 26 and 30 all communicate at their inner ends with the annular groove 60. In this way the pump 40 supplies lubricating oil from a supply passage 62 to the cylinders 22 and 24 via passages 42 and 50, annular groove 52, holes 54, annular groove 56, holes 58 and annular groove 60 and thence through passages 26 and 30 to the cylinders 22 and 24. The oil transfer bushing 44 is provided with suitable seal rings 63 to minimize oil leakage from its grooves and passages. It will be apparent, however, that the accuracy of the torque measurement of the invention is not dependent on these seals being 100% effective.

A hollow two-part piston 64 is slidable in each cylinder 22 and a two-part piston 66 is slidable in each cylinder 24 thereby forming a plurality of piston-cylinder assemblies. A sleeve 68 is axially splined to the input shaft 12, said sleeve having an annular flange 70 from which a plurality of circumferentially-spaced arms 72 extend axially. Each arm 72 is engageable with a button-like formation 74 on the outer end of a piston 64 and 66.

The cylinder head end of each cylinder is also provided with a button-like projection 76 each of which engages or substantially engages the side of an arm 72 opposite to the side of said arm engaged by a piston button 74. This latter construction is provided to minimize back-lash or play in the coupling between the shafts 12 and 14.

The housing support member 38 and annular member 46 secured thereto have second serially-connected communicating passages 76 and 78 respectively. The inner end of the passage 78 communicates with the annulus 54 and the outer end of the passage 76 communicates with an oil pressure gage 80 whereby the gage indication is a measure of the oil pressure at the oil transfer bushing 44.

Figure 2:
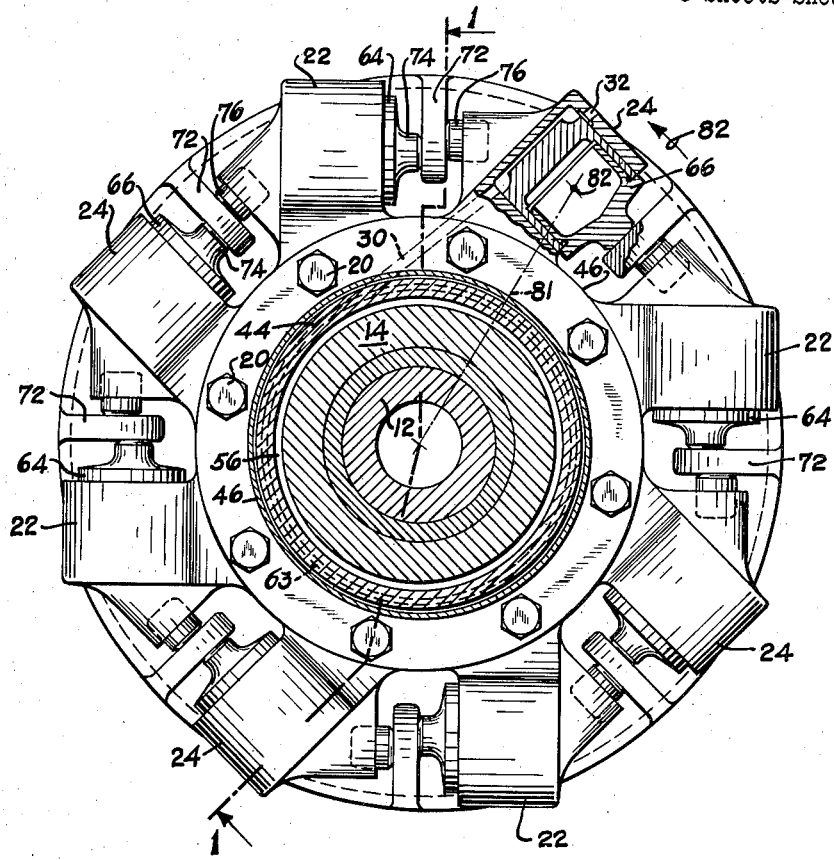
Fig. 2 is a sectional view taken along line 2—2 of Fig. 1.

The contemplated direction of rotation of the shafts 12 and 14 is counterclockwise as viewed in Fig. 2 and as indicated by the arrow 82. With the aforedescribed construction, the pistons 64 and 66 are moved, relative to their cylinders by the forces acting thereon to vary the extent their cylinder drain passages 28 and 32 are covered, until the hydraulic pressure force acting axially on each piston balances the other forces acting on said piston. Thus an increase or a decrease in the force exerted on each piston 64 and 66 by its contacting arm 72 causes each piston to move in a direction to effect a closing or opening adjustment respectively of the drain passage 28 or 32 for its respective cylinder to increase or decrease the hydraulic pressure in its cylinder until the forces acting on the pistons along their axes are again in balance. In this way the pistons 64 and 66 automatically move relative to their respective cylinders 22 and 24 to regulate the hydraulic pressure in said cylinders so that the forces on each piston along its axis are maintained in balance.

As previously stated the axis of each piston-cylinder assembly is inclined to the tangential direction. More specifically the axis of each piston-cylinder assembly is oriented so that it is inclined to a radius 81 from the axis of the shafts 12 and 14 and passing through the center of gravity 82 of its piston, this inclination being such that centrifugal force acting on each piston has a component urging the piston toward its cylinder head end.

With this arrangement, the hydraulic oil pressure force acting on each piston 64 and 66, along its axis is balanced against the component of the centrifugal force on the piston along said axis and the force exerted on the piston by the torque transmitting arm 72 contacting said piston. The inclination of each piston-cylinder axis has been made such that said centrifugal force component acting on each piston axially along its axis is equal and opposite to that part of the hydraulic oil pressure force acting on the piston along said axis resulting from the centrifugal forces on the oil. If this is true at one rotational speed it will be true at all rotational speeds. Now, since the hydraulic oil pressure in each cylinder 22 and 24 is equal to the sum of the static oil pressure at the bushing 44 and an increment in oil pressure resulting from the centrifugal forces on the oil, it is apparent that the force exerted against each piston by its contacting arm 72 is equal to remaining part of the opposing hydraulic pressure force acting on each piston, namely, to that part resulting from the static pressure of the oil supplied to the bushing 44. Therefore, since the force exerted by the arms 72 against the pistons 64 and 66 is proportional to the torque transmitted by the shafts 12 and 14, the hydraulic pressure at the bushing 44 is also proportional to said torque. Hence, since the gage 80 responds to the pressure at the bushing 44, said gage can be and is calibrated to indicate the transmitted torque so that it accurately indicates said torque regardless of the speed of the shafts 12 and 14.

From what has been said, it should be apparent that the inclination of the axes of the piston-cylinder assemblies is such as to compensate for the variable part of the oil pressure force on the pistons 64 and 66 resulting from the centrifugal forces on said oil at various rotational speeds whereby the gage 80 can be calibrated to indicate the transmitted torque notwithstanding speed changes of the shafts 12 and 14.

It should be noted, however, that the compensating force resulting from the inclination of the axes of the pistons 64 and 66 can provide complete compensation for the centrifugal forces on the oil only at a particular oil density. If, for example, the oil density should increase because of a decrease in oil temperature, then the component of the centrifugal force on each piston, along the piston axis, would no longer completely balance the part of the opposed oil pressure force on the piston resulting from the centrifugal forces on the oil. This obviously would result in an error in the torque indication of the meter 80. Any such error, however, is small and can be minimized by making the radial distance of the cylinders 22 and 24 from the axes of rotation as short as practical.

As noted, the specific torque measuring apparatus described is designed for use with an oil or other liquid of a given density. It can, however, be used with a liquid of substantially different density and still provide accurate torque measurement provided pistons 64 and 66 of appropriately different weight are substituted such that the component of the centrifugal force on each new piston along the piston axis exactly balances the part of the opposing hydraulic pressure force on the piston resulting from the centrifugal forces on said different density liquid.

At this point it should also be noted that the actual axial displacement of the pistons 64 and 66 across their associated drain passages 28 and 32 for controlling the oil pressure in their cylinders is sufficiently small so that for purposes of this invention the position of the center of gravity of each piston 64 and 66 relative to its cylinder can be considered to be constant.

As previously noted, the pistons 64 and 66 have a two-part hollow construction. This hollow construction facilitates designing the piston so that the component of the centrifugal force acting thereon along the piston axis is equal and opposite to the portion of the oil pressure force on the piston resulting from the centrifugal forces on the oil. It should also be noted that notwithstanding the inclination of the axis of each piston 64 and 66 to a radius through its center of gravity, the point of contact of each piston with a torque transmitting arm 72 is on the piston axis at a point at which the radius through said point is perpendicular to the axis of the shafts 12 and 14. This arrangement avoids side loads on the pistons 64 and 66.

With the construction of each member 16 and 18 described, each cylinder drain passage 28 and 32 is displaced slightly to one side of the radially outer generating element of its cylinder. This raises the possibility of sludge or other foreign matter in the oil accumulating along said radially outer element of each cylinder adjacent to its drain passage thereby restricting outward flow of oil through said drain passage. To avoid this possibility, a circumferentially extending groove 84 is cut across each drain passage 28 and 32 to alter the internal profile of the section of the cylinder at its drain passage so as to place the passage at the outermost radial portion of said section profile and at the same time avoid any pockets in said profile in which sludge could accumulate. For this purpose the circumferential length of each groove 84 is at least several times the diameter of its associated drain passage 28 or 32.

With the structure described, the cylinders 22 and 24 are formed rotationally rigid with the output shaft 14 while the pistons 64 and 66 are free for sliding movement within said cylinders 22 and 24 respectively, said pistons having only a push connection through the arms 72 with the input shaft 12. It is obvious, however, that in lieu thereof said cylinders could have been formed rotationaly rigid with the input shaft 12 in which case the arms 72 would be on the output shaft. Likewise if the shaft 14 rather than the shaft 12 were the input shaft and the direction of rotation were in a clockwise rather than in a counter-clockwise direction, as viewed in Fig. 2, then the torquemeter gage 80 would still indicate the magnitude of the transmitted torque.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a combination with first and second co-axial shafts; a plurality of circumferentially-spaced piston and cylinder assemblies rotatable with and coupling said shafts together for torque transmission at 1:1 speed ratio; each said assembly comprising a cylinder element and a relatively slidable piston element with one of said elements being connected to one of said shafts and the other of said elements having only a push connection with the other of said shafts so that the force between said other shaft and push-connected element is proportional to the transmitted torque; means for supplying a liquid pressure between said elements of each assembly for transmitting said torque, each said assembly being disposed so that its axis is inclined to a radius from the axis of said shafts and passing through the center of gravity of its said push-connected element so that during rotation of said shafts the component, along the assembly axis, of the centrifugal force on said push-connetced element is substantially equal and opposite to the force exerted on said push-connected element, along its assembly axis, by that portion of the pressure of said liquid resulting from the centrifugal forces on said liquid.

2. The combination recited in claim 1 and including valve port means controlled by relative motion of the piston and cylinder elements of at least one of said assemblies for regulating the hydraulic pressure between the two elements of each assembly so that an increase in the torque-proportional forces on each push-connected element results in a corresponding increase in the opposing hydraulic pressure force on each push-connected element.

3. The combination recited in claim 2 in which said valve port means comprises a passage through the wall of each cylinder on its radially outer side and adjacent to its cylinder head end for the escape of liquid from its cylinder, each said passage being disposed so that relative sliding motion of its push-connected element is effective to control the escape of liquid through said passage whereby the liquid pressure in each cylinder is controlled by said relative piston motion.

4. The combination recited in claim 1 and including valve port means controlled by relative motion of the piston and cylinder elements of at least one of said assemblies for regulating the liquid pressure between the two elements of each assembly so that the liquid pressure force between said elements balances the forces on said elements resulting from the torque transmission by and rotation of said shafts.

5. In combination first and second co-axial shafts; means connecting said shafts together for torque transmission at 1:1 speed ratio; said means comprising a pair of members each having a plurality of circumferentially-spaced cylinders such that the cylinders of one member are disposed between the cylinders of the other member with said cylinders each having an open end facing in the same circumferential direction; means connecting said members together to form a rigid structure and means on one of said members drivably connecting said members with one of said shafts; a piston slidable in each of said cylinders; and a plurality of arms on the other of said shafts, there being one such arm for each piston with each arm having only a push connection with its associated piston so that the force between each arm and piston is proportional to the transmitted torque; means for supplying a liquid under pressure between the piston and cylinder of each such combination for transmitting said torque, the axis of each said piston and cylinder combination being inclined to a radius from the axis of said shafts and passing through the center of gravity of its said piston so that during rotation of said shafts the component along the piston axis of the centrifugal force on said piston is substantially equal and opposite to the force exerted on the piston along the piston axis by that portion of the pressure of said liquid resulting from the centrifugal forces on said liquid.

6. The combination recited in claim 5 in which each said member has a first passage for each of its cylinders for supplying said liquid under pressure to the radially inner side of each cylinder at its cylinder head end, and in which each said member has a second passage for each of its cylinders on the radially outer side of each cylinder and adjacent to its cylinder head end for the escape of said liquid from the cylinder, each said cylinder second passage being disposed so that relative sliding movement of its piston is effective to control the escape of liquid through said second passage so that an increase in the torque porportional force on each piston results in a corresponding increase in the opposing hydraulic pressure force on each piston.

7. The combination recited in claim 6 in which the inner wall surface of each cylinder has a circumferentially-extending recess extending across the inner end of its said second passage and having a length of at least several times the diameter of said second passage.

8. In combination with first and second co-axial shafts; a plurality of circumferentially-spaced piston and cylinder assemblies rotatable with and coupling said shafts together for torque transmission at 1:1 speed ratio; means for supplying a liquid under pressure to each of said rotatable assemblies for transmitting said torque, each said rotatable piston and cylinder assembly having one of its elements free for sliding movement along the assembly axis and said assembly having its axis so oriented that the component of the centrifugal force on its said slidable element in the direction of said assembly axis is substantially equal and opposite to that part of the force exerted on said element by the liquid pressure within said rotatable assembly resulting from the centrifugal force on said liquid.

9. In combination with first and second co-axial shafts; a plurality of circumferentially-spaced piston and cylinder assemblies rotatable with and coupling said shafts together for torque transmission at 1:1 speed ratio; means for supplying a liquid under pressure to each of said rotatable assemblies for transmitting said torque, each said rotatable piston and cylinder assembly having one of its elements free for sliding movement along the assembly axis and said assembly having its axis inclined to a radius from the axis of said shafts and passing through the center of gravity of its said slidable element so that the component of the centrifugal force on its said slidable element in the direction of said assembly axis is substantially equal and opposite to that part of the force exerted on said element by the liquid pressure within said rotatable assembly resulting from the centrifugal force on said liquid.

10. The combination recited in claim 8 and including valve port means controlled by relative motion of the piston and cylinder elements of at least one of said assemblies for regulating said liquid pressure.

References Cited in the file of this patent
UNITED STATES PATENTS

| | | |
|---|---|---|
| 195,837 | Nagle | Oct. 2, 1877 |
| 517,439 | Cross | Apr. 3, 1894 |
| 2,365,443 | Angst | Dec. 19, 1944 |
| 2,386,367 | Taylor | Oct. 9, 1945 |
| 2,581,239 | Clark et al. | Jan. 1, 1952 |